United States Patent [19]

Block

[11] Patent Number: 4,622,774
[45] Date of Patent: Nov. 18, 1986

[54] ANIMAL TRAP

[76] Inventor: Ambrose F. Block, Rte. 3-Box 26, Woonsocket, S. Dak. 57385

[21] Appl. No.: 710,706

[22] Filed: Mar. 11, 1985

[51] Int. Cl.⁴ ............................................. A01M 23/26
[52] U.S. Cl. ........................................... 43/88; 43/92
[58] Field of Search .................... 43/88, 90, 91, 92, 93, 43/94, 95

[56] References Cited

U.S. PATENT DOCUMENTS

| | | | |
|---|---|---|---|
| 409,467 | 8/1889 | Kelley | 43/92 |
| 860,639 | 7/1907 | Crago | 43/92 |
| 1,176,670 | 3/1916 | Ergenbright | 43/92 |
| 1,465,528 | 8/1923 | Rufty | 43/88 |
| 2,216,911 | 10/1940 | Hannold | 43/90 |
| 2,713,745 | 7/1955 | Bruske | 43/92 |
| 2,877,596 | 3/1959 | Elencik | 43/88 |
| 4,045,905 | 9/1977 | Souza | 43/88 |
| 4,486,972 | 12/1984 | Helfrich | 43/88 |

Primary Examiner—Nicholas P. Godici
Assistant Examiner—K. Rowan

[57] ABSTRACT

An improved animal trap adapted to be less injurious to a trapped animal because of a center mounted swiveling chain. The trap also has a flat base made possible by novel way of fastening the trigger mechanism to the base and uses a novel self-setting trigger system. Furthermore, because of unique jaw levers, the initial force tending to close the trap is substantially greater than that of former traps of similar size and conformation.

10 Claims, 9 Drawing Figures

ANIMAL TRAP

BACKGROUND AND SUMMARY OF THE INVENTION

This invention pertains to animal traps of the type having two jaws forced together by a spring or springs, and more particularly to a trap of that type having a mechanism both more efficient and more humane.

A type of animal traps called "leg traps" has been in use for a long time. These traps generally include a pair of generally "D" shaped jaws pressed together by one or more spring-loaded levers. The trap uses a trigger set to be sprung by the foot of an animal stepping onto the trigger between the jaws which are held open by the trigger mechanism. These traps are usually held in place against the pulling of a trapped animal by means of a chain usually attached to the trap a position remote from the jaws, or at least at one edge of the trap.

Traps of this general type have often been called inhumane principally because of the results of their use. For example, animals sometimes escaped the traps and left behind portions of the leg that was caught. This was the result of a broken leg which then could be gnawed or wrenched off by the animal. The result was a wild animal without the necessary physical attributes to hunt and capture its food in the wild.

The cause of the broken leg in instances such as that described was usually either that the trap jaws had held at a point so high on the leg that there was enough leverage on that leg that the animal by its tugging could break the bone, or the off-center connection of the chain to the trap caused the trap to twist the leg as the animal tugged away with the result of a broken bone.

With my improved trap, I provide a center connected swiveling attachment for my trap. The result is that a tugging animal pulls directly on a straight line against the holding chain and there is no twisting nor bending moment tending to bend or twist and break the animal's leg. I also provide in my unique trigger mechanism a device which tends to push back somewhat on the foot of any animal stepping on the trigger. This results in a caught foot rather than a leg and therefore is less leverage on the longer bone in the foot. In spite of the central connection of the chain to the trap, I provide by means of my unique construction for a perfectly flat base of the trap so that it can be set on a flat surface and not rock or tilt. This construction is accomplished both by the way the chain is attached to the trap and by the mounting of the trigger and seer mechanism.

FIGURES

Figure 2:
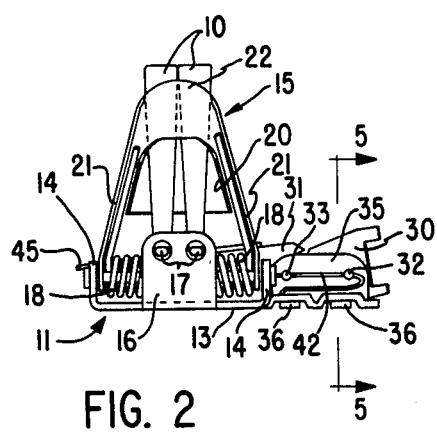
FIG. 2 is an end elevational view of the trap shown in FIG. 1.
Figure 5:
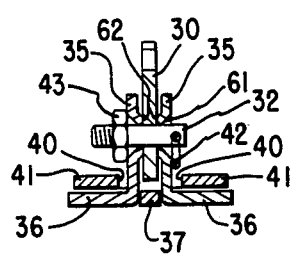
Figure 6:
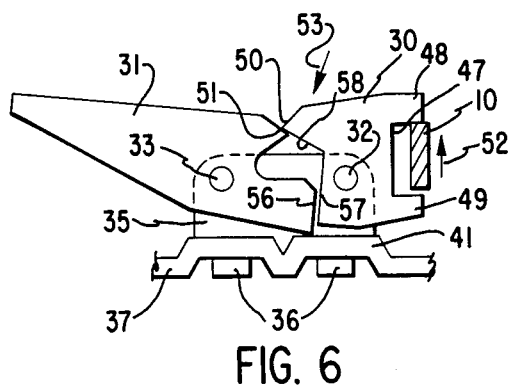
Figure 7:
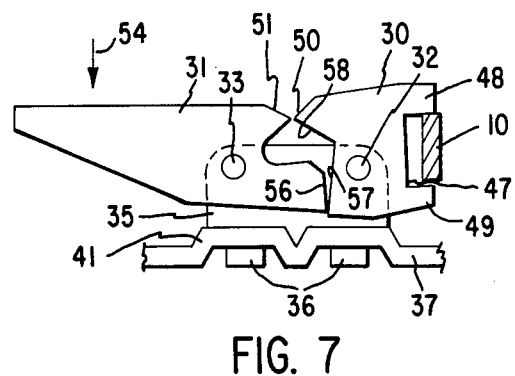
Figure 8:
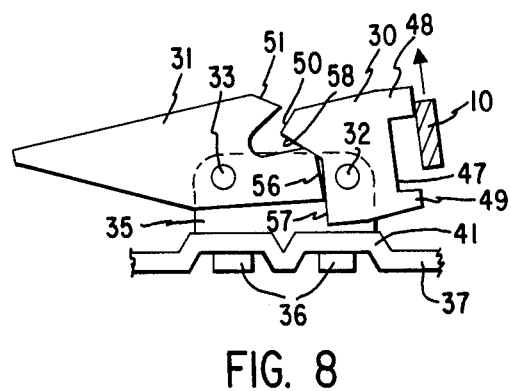
Figure 9:
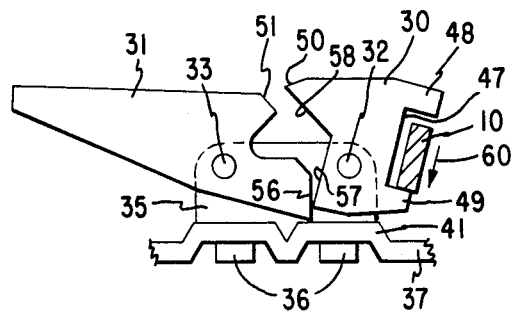

FIG. 5 is a detailed view of the mounting means of the trigger of the trap from line 5—5 of FIG. 2, FIG. 6 is a detailed view of the seer and trigger mechanism in the fully set position, FIG. 7 is a view similar to FIG. 6 of the mechanism at the moment of release, FIG. 8 is a view of the mechanism similar to FIGS. 6 and 7 as the jaw moves away from the seer, and FIG. 9 is a view of the mechanism similar to the prior views, but showing the jaw being reset.

DESCRIPTION

Briefly my device comprises a new trap having many features which make it a more humane and more effective trap. Included among those features are a perfectly flat base, a chain fastened by swiveling means at very nearly the center of the base, a unique and effective self-setting trigger mechanism and a spring and jaw lever configuration which applies greater starting pressure to the set jaws than that in prior traps.

Figure 3:
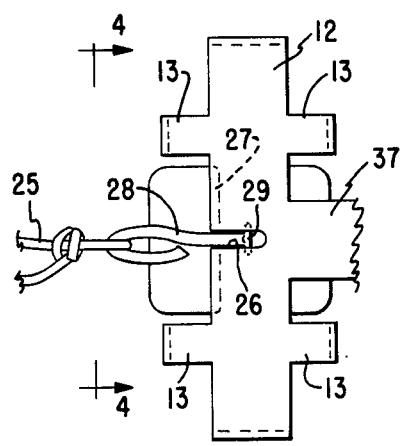
FIG. 3 is a plan view from the bottom of the trap.

More specifically and referring to the drawings, my trap, in overall appearance is not greatly different from previous dual spring traps. It consists of a pair of D-shaped jaws 10 pivotally mounted on a base 11. That base consists essentially of an elongated longitudinal member 12 (FIG. 3) from which extend lateral members 13. These lateral members terminate in ears 14 bent upward to provide pivotal mounts for jaw actuating members or jaw levers 15. The ends of the member 11 are also bent upward to form substantially vertical tabs 16 in which stub ends 17 of the jaws 10 are journalled. Torsion springs 18 are engaged between the base 11 and the jaw levers 15 to urge the levers to an upright or closed position. Thus far, the trap has all the familiar features which are well known in the art.

However, the jaw levers and the springs are different in several aspects. First, the jaw levers 15 are broader than are usual. The ears 14 are spaced quite well apart on the base 11 and therefore can accommodate a pair of springs 18 for each lever 15. In this way, one spring engages each side of each lever 15 and the two springs together provide a balanced force on each lever so as to avoid a twisting moment tending to distort the lever and to apply unequal loads to the individual jaws 10. In this way, I provide a more durable trap.

The levers 15 are also unique in the shape of the opening 20 in each which surrounds the jaw. As noted, the ears 14 are relatively widely spread. Thus, the legs 21 of the lever 15 can be widely spread. The spread allows the opening 20 to be formed as a tapering opening from the widest part near the ears 14 to a much narrower part near the outer end 22 of the lever. The taper, in effect provides a cam action on the jaws 10. When the trap is set, the jaws are spread out, and the levers are down. In that position, the jaws engage the edge of the opening 20 in the levers 15 somewhere toward the wider part of the opening. Thus, there is more leverage exerted on the jaws, because the force is applied farther from the fulcrum of the lever at the pivot point of the jaw. Thus, the starting force on the jaws when the trap is sprung is highest right at the time of triggering the trap and is available to overcome the static inertia of the jaws 15. This force is augmented by the increased stress in the springs 18 as they are twisted in setting the trap.

The holding chain 25 is fastened to the base of the trap at or near the central point between the ends 27 of the jaws. This is desirable so that when the leg of any animal is caught in the jaws, any pull on that leg will be a direct pull against the chain rather than a twisting or bending pull. Twisting—or particularly bending—tends to result in broken or torn legs with the resultant escape of an injured animal or at least considerably increased pain for the animal. If the attachment point of the chain is off-center, then there is very apt to be a bending moment on the jaws tending to break the leg. I avoid this problem and still maintain a flat base for the trap by forming a slot 26 in the longitudinal member 12 and continuing that slot into a tab 27 bent upward from the member 12. A holding link 28 extends through the slot 26 and terminates in an expanded head 29 large enough to retain the link within the slot.

When set, the trap is placed so that the link 28 extends through the slot portion in the tab 27, thus preserving the flatness of the base of the trap.

This flatness is desirable so that the trap can lie firmly on any base. Any irregularity in the base will result in tilting of the trap which is apt to frighten the quarry away. Therefore, it is important to maintain a flat base in the fastening of the trigger mechanism to the base also.

Figure 1:
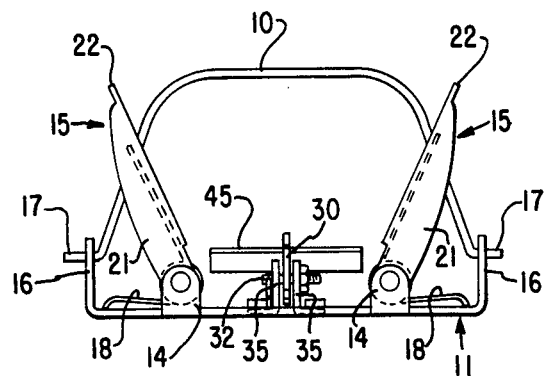
FIG. 1 is a side elevational view of the trap with the jaws closed.
Figure 4:
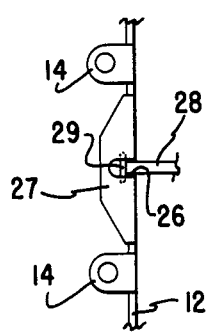
FIG. 4 is a detailed view from line 4—4 of FIG. 3.

That fastening is shown in FIG. 5 as well as FIGS. 1 and 2. The seer 30 and the trigger arm 31 are journalled on pins 32 and 33 extending through the vertical portions 35 of a pair of brackets. Each bracket is formed as an angular member having a vertical portion 35 and a pair of substantially horizontal feet 36. A side plate 37 extends from the member 12, and is formed to provide slots 40 through which the feet 36 can extend. The portions of the plate 37 outwardly of the slots 40 are pressed upward to form bridges 41 to allow the feet 36 to lie within those bridges. The base then remains flat with the underside of the feet lying in the same plane as the underside of the plate 37 and the member 12.

When the brackets are fully assembled with the seer 30, and the arm 31 in place on their pins 32 and 33, that entire assembly is firmly held in place on the plate 37. The pins 32 and 33 are held on one end by a spring wire 42 extending through holes in the pins. The other ends are threaded and a nut 43 used to hold the pin in its proper location.

The sideplates 37 are preferably formed to provide dimples 61 adjacent the holes through which the pins 32 and 33 extend. This shape provides a surface 62 against which the seer 30 and trigger arm 31 will rub. By adjusting the nut 43 to pull on the pins 32 and 33 and to pull them against the wire 42, the amount of pressure, and therefore the friction, between the surface 62 and the seer 30 and arm 31 can be adjusted. Thus, the seer and trigger arm can be held more or less loosely in place and will not simply bounce or float from one position to another.

I also provide a unique trigger mechanism best illustrated in FIGS. 6–9 inclusive. The trigger arm 31 as noted above is journalled adjacent the seer 30 in the brackets 35. This arm carries the usual pan 45 shown in FIG. 1 but not in FIGS. 6–9. Because this arrangement is common to most traps of this type, this feature is not important to any part of my invention.

FIG. 6 illustrates the assembly of trigger, seer and jaw in its normal "set" position. The jaw 10 is held in an indentation 47 formed in the seer 30 having an upper leg 48 and a lower leg 49 to define the open area. There is a force on the jaw 10 in the direction shown by the arrow 52. This force is caused by the action of the springs 18 on the levers 15. The force tends to rotate the seer 30 around its pin 32 in the direction indicated by the arrow 53. This tendency is blocked in the set position (FIG. 6) by engagement between a point 50 on the seer and a trigger surface 51 on the arm 31. The surface 51 is preferably not a flat surface but lies in an arc having a center at the center of rotation of the arm 31 about the pin 33. Thus, it will be very easy to trip the trigger by sliding the surface 51 out from under the point 50.

When the trigger is sprung by an animal stepping on the pan 45, the trigger arm is moved in the direction indicated by the arrow 54 (FIG. 7). Thus, the arm 31 is rotated in a counterclockwise direction (in the figure) around the pin 33. This rotation moves the surface 51 away from the point 50 and thus releases the seer 30 to rotate and release the jaw 10 from the upper leg 48 (See FIG. 8).

A lower contact surface 56 of the trigger arm is also moved into contact with an engagement face 57 on the seer. This contact may also tend to rotate the seer, although the principal impetus for such motion is the force on the jaw 10.

Movement of the seer to the position shown in FIG. 8 releases the jaw 10, and results in stopping further rotation of the seer by contact between a part of the trigger arm 31 and the lower surface 58 of the point 50. The movement to the position of FIG. 8 leaves the trigger mechanism in position for resetting of the trap. Further, because of the forceful rotation of the seer caused by the force on the jaw 10 being released, there is some tendency for the surface 58 to press downward on the adjacent portion of the trigger lever. This in turn tends to move the trigger lever so that the pan 45 will be raised slightly. The net result is to press upward on the foot of the animal so that the jaws 10 will not catch high on the leg but nearer the animal's foot.

The resetting is easily accomplished by depressing of the levers 22 against the springs 18. The jaws 10 are spread until the one jaw is again brought into contact with the lower leg 49 of the indentation 47. Further movement of the jaw 10 in the direction of the arrow 60 (FIG. 9) rotates the seer 30 to the position shown in FIG. 9. This rotation brings the surface 57 against the lower contact surface 56 and presses the trigger arm 31 back up to the set position in which the surface 51 is again below the point 50. Release of the springs will cause the jaw 10 again to move the seer 30 to the position of FIG. 6 with the point 50 pressed against the surface 51, and again the trap is set.

Thus I have provided a trap having a flat base for better setting, a central chain connection to provide a more humane trap, a trap capable of easy resetting, and one in which the force on the jaws to start the entrapment movement of the jaws is kept at a maximum.

I claim as my invention:

1. An animal trap comprising a base, a pair of jaws pivotally journaly on said base and movable from an open position in which said jaws are separated to a closed position in which said jaws lie immediately adjacent each other, lever means pivotally mounted on said base and having leg portions embracing said jaws and in contact therewith, said leg portions being sloped so that the wider spread portion is in contact with said jaws in the open position and the narrower portion when said jaws are in their closed position and spring means engaged with said lever means to urge said lever means toward said closed position, said base including a longitudinal portion and an upward tab on said portion, said longitudinal portion and said tab being formed to provide a continuous slot from a point on said longitudinal portion centrally under said jaws to and into said tab portion, link means having a straight portion able to lie in said slot so that the base is flat, and a knob on said link means large enough to prevent withdrawal of said link means from said slot, fastening chain means being attached to said link means for anchoring said trap.

2. An animal trap comprising a base, a pair of jaws pivotally journalled on said base and movable from an open position in which said jaws are separated to a closed position in which said jaws lie immediately adjacent each other, lever means pivotally mounted on said base and having leg portions embracing said jaws and in contact therewith, said leg portions being sloped so that the wider spread portion is in contact with said jaws in the open position and the narrower portion when said jaws are in their closed position and spring means engaged with said lever means to urge said lever means toward said closed position, said base including a longitudinal member, said jaws and said lever means being mounted on said longitudinal member, said base also including a side plate extending laterally from said longitudinal member, said side plate being formed to provide slots therein, bracket means having feet removably extending through said slots and extending beneath said side plate, and trigger means mounted on said bracket means.

3. The device of claim 2 in which said side plate is formed with bridges in the region of said slots to receive the feet of said bracket means whereby the underside of said base remains in a single plane.

4. The device of claim 3 in which said bracket means include a pair of brackets each having horizontal feet and side vertical portions at substantially a right angle to said feet, said verticle portions being substantially parallel to each other and perpendicular to said side plate, a pair of pins extending from one vertical portion to the other across the space between said vertical portions, seer means journalled on one of said pins and adapted to hold one of said jaws, trigger means journalled on the other of said pins adapted to move from a set position in which a portion of said trigger means interferes with pivotal movement of said seer means to hold said jaw in a set position in which said seer means rotates to release said jaw.

5. The device of claim 4 in which said side portions are formed with dimples at the location of said pins whereby friction can be generated between said seer and trigger arm on the one hand and said side portions on the other.

6. The device of claim 8 in which said pins are held at one end by spring wire means extending across said dimples and said pins are threaded at the end opposite said wire means, nut means on said threaded end whereby the tension against said wire means can be adjusted.

7. For a trap having jaws adapted to move from a set position to a closed position, trigger means including spaced apart parallel side portions, seer means pivotally mounted between said side portions, said seer means being formed to provide a point having a lower surface, said seer means having an engagement face, extending downwardly from said lower surface, trigger lever means also pivotally mounted between said side portions adjacent to said seer means, said lever means having a set position and a release position corresponding to said set position and said closed position of said jaws, said seer means being formed to receive at least one of said jaws to hold said jaw, said lever means being adapted to interfere with motion of said seer means when said lever means is in its set position and to release said seer means when said lever means is in its released position, said lever means having a trigger surface adjacent said lower surface and adapted to engage said lower surface in said set position, said point being of such length to be free from said trigger surface in the release position of said lever means, said trigger means also having a contact surface adjacent to said engagement face of said seer means, said contact surface being disengaged from said engagement face in the set position, but being engaged as said lever means moves to the release position.

8. The device of claim 7 in which said trigger surface is of arcuate shape, said shape being of an arc having a center at the center about which said lever means pivots.

9. The device of claim 7 in which said seer means also has a set position, and a release position corresponding to those positions of said lever means and also has a resetting position; the contact surface of said lever means having a portion adapted to engage said lower surface of said point on said seer means in the release position, said contact surface and said lower surface being positioned relative to said pins and formed so that pressure from said seer means through said engagement face against said contact surface to said lever means is effective to move said lever means back to said set position.

10. The device of claim 7 in which said seer means is pivotally mounted on a first pin and said lever means is mounted on a second pin, said pins extending between said side portions, said side portions being formed with dimples in the area where said pins extend and engaging said seer means and said lever means, spring wire means extending between said pins and over the dimples on one side of said side portions whereby one end of each of said pins is held in place, and adjustment means on the ends of said pins opposite said wires whereby the opposite end of each of the pins is held in place and whereby the tension of said wire means against said pins and said side portions may be adjusted to adjust the friction between said side portions and said seer means and said lever means.

* * * * *